Feb. 9, 1954
A. F. BARTOLAT
2,668,555
EXCESS FLOW CUTOFF VALVE WITH ADJUSTABLE VALVE SEAT
Filed April 7, 1951
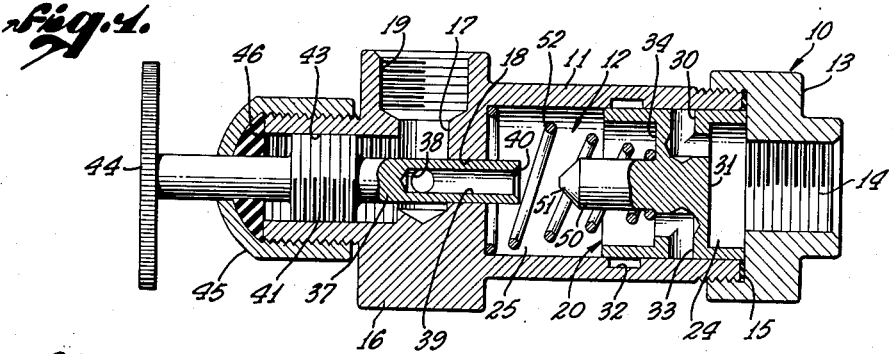
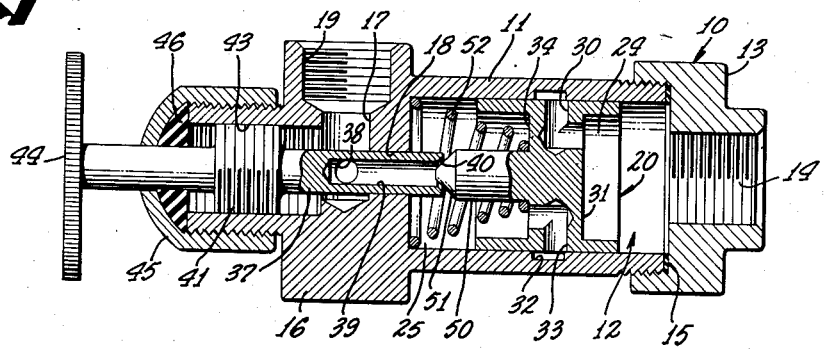
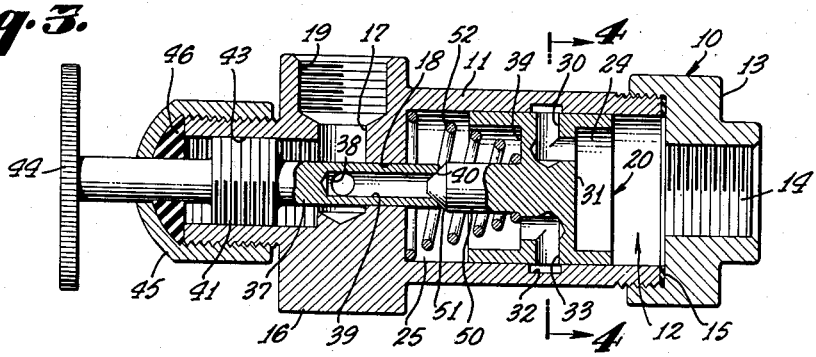
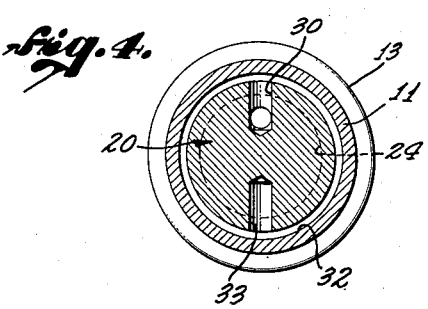
ALBERT F. BARTOLAT,
INVENTOR.
ATTORNEY.

Patented Feb. 9, 1954

2,668,555

UNITED STATES PATENT OFFICE 2,668,555

EXCESS FLOW CUTOFF VALVE WITH ADJUSTABLE VALVE SEAT

Albert F. Bartolat, Gardena, Calif.

Application April 7, 1951, Serial No. 219,805

8 Claims. (Cl. 137—498)

This invention relates to fluid-flow control devices and more particularly pertains to a flow regulating valve for use in fluid systems. While the principles involved are applicable to gaseous fluids, as well as liquids, the invention will be described herein for the purpose of disclosure as embodied in a valve for regulating the flow of a liquid.

The invention is useful, for example, in installations where the primary requisite is to provide a normal rate of flow of a given magnitude, as in certain hydraulic systems and in systems for circulating, filtering, or feeding a liquid at a constant rate and/or pressure.

The preferred form of the invention is a compact valve structure that may be connected to the pipe or tubing of a system and after installation may be manually adjusted at will to maintain selected rates of flow and/or selected pressures downstream from the valve notwithstanding wide fluctuations of pressure upstream from the valve.

A feature of the invention is that it may be used to advantage as means for protecting a system or a part of a system from damage by pressure surges. For example, such a device may be used to protect a filter unit that is of such character and construction as to be susceptible to damage by steep pressure rises. The present regulating valve automatically responds to sudden pressure rises by choking down flow and meets any excessive pressure surge by momentarily completely closing to cut off the system downstream from the valve.

In addition to these features it is often desirable to provide in the same regulating device automatic prevention of reverse flow in the event pressure upstream from the valve drops abnormally below the pressure downstream from the valve. The present flow regulator not only responds to predominance of upstream pressure in the manner heretofore described, but also functions as a check valve to close automatically in response to predominance of downstream pressure.

Finally, it is contemplated that the present valve will serve a further purpose in assuring continuous uninterrupted flow in systems where the fluid is of such character as to tend to clog regulating devices. Usually such clogging occurs in a more or less accumulative manner under steady state conditions. To prevent such clogging, the present invention includes a movable wall member that is highly sensitive to small pressure changes and in the course of its responsive action functions in a positive manner to dislodge any clogging material at critical points in the valve.

Broadly described, the regulating valve having these features incorporates a movable wall such as a piston to divide a valve chamber into an inlet portion and an outlet portion in a variable manner and relies upon this piston to control flow through the valve. The fact that flow through the valve depends upon the position of the piston makes it possible to adjustably control flow by adjustably controlling the position of the piston. While the piston is free to move in response to predominant pressure in either direction, it tends to seek an equilibrium position and this equilibrium position can be adjustably varied. The piston is free to move in one direction from its equilibrium position to cut off flow in response to pressure surges upstream from the valve and is likewise free to move in the opposite direction to cut off flow when the upstream pressure drops excessively below the downstream pressure.

In the preferred embodiment of the invention two valve actions are performed by the piston, one valve action controlling flow past the piston from the inlet portion of the valve chamber to the outlet portion, and the other valve action controlling flow from the outlet portion of the valve chamber through the outlet port. This last valve action is provided by a valve seat together with a cooperating valve member carried by the piston. The valve seat is adjustable relative to the piston and its adjustment both limits the range of movement of the piston and determines the equilibrium position the piston will seek under given conditions.

The above and other features and advantages of the invention will be apparent in the detailed description to follow, taken with the accompanying drawings.

In the drawings, which are to be regarded as merely illustrative,

Figure 1 is a longitudinal sectional view of the present preferred embodiment of the invention with some parts in side elevation, the piston being shown at one of its limit positions to cut off reverse flow;

Figure 2 is a similar view showing the piston at an intermediate equilibrium position;

Figure 3 is a similar view showing the piston at its second limit position cutting off flow in response to an excessively high pressure surge upstream from the valve; and Figure 4 is a transverse section taken as indicated by the line 4—4 of Figure 3.

In the form of the invention shown in the drawings, the valve has a casing, generally designated 10, with a cylindrical wall 11 that forms a valve chamber, generally designated 12. Threaded onto one end of the casing 10 is a cap 13, having an inlet port 14 threaded for connection to pipe or tubing, the joint between the cap and the cylindrical wall 11 being sealed by a suitable gasket 15. At the other end of the casing is a thick transverse wall 16 having a transverse bore 17 and an intersecting longitudinal bore 18 forming an outlet passage to the chamber 12. The outer end of this passage is enlarged and threaded to provide an outlet port 19 adapted for connection to pipe or tubing.

A piston, generally designated 20, mounted in the valve chamber 12 in a freely slidable manner responds to pressure differentials in either direction and, therefore, may be said to divide the valve chamber in a variable manner into an inlet portion 24 and an outlet portion 25. It is contemplated that the pressure-responsive piston 20 will operate a first valve means for controlling flow from the inlet portion 24 of the valve chamber to the outlet portion 25 and will operate a second valve means for controlling flow from the outlet portion 25 of the valve chamber through the outlet port 19. The arrangement is such that the piston progressively opens the first valve means as it progressively closes the second valve means and vice versa so that the piston tends to seek an equilibrium position at which both of the valve means are partially open. The two valve means may be constructed in various ways in various practices of the invention.

In the construction shown in the drawing, the first valve means operated by the piston 20 is a passage from the inlet portion 24 of the valve chamber to the outlet portion 25, which passage is formed in part by the piston and in part by the cylindrical wall 11 of the valve chamber so that the flow capacity of the passage depends upon the position of the piston. The passage has three parts, namely, an angular inflow passage 30 in the piston 20 extending from the upstream face 31 of the piston to the periphery of the piston, a circumferential passage in the form of a groove 32 around the inner circumference of the cylindrical wall 11, and an outflow passage 33 extending through the piston from the piston periphery to the downstream face 34 of the piston.

When the piston is in its rightward limit position, as shown in Figure 1, the two angular passages 30 and 33 of the piston are out of register with the circumferential groove 32 whereby communication between the inlet portion 24 of the valve chamber and the outlet portion 25 is cut off. As the piston moves leftward, the two angular passages 30 and 33 of the piston move into partial registration with the circumferential groove 32, as shown in Figure 2, and the freedom for flow through the piston increases progressively as the piston approaches its leftward limit position shown in Figure 3.

To provide the second valve means under control of the piston 20, a valve seat may be provided in the longitudinal bore 18 that constitutes part of the outflow passage leading to the outlet port 19 and preferably such a valve seat is arranged for adjustment relative to the piston 20. For this purpose a member 37 that may be termed a valve stem extends through the longitudinal bore 18 into the outlet portion 25 of the valve chamber 12. This valve stem 37 has a diametrical bore 38 in communication with the transverse bore 17 of the valve casing and also has an intersecting axial bore 39 that terminates in a valve seat 40 facing the piston 20.

For axial adjustment, the valve stem 37 has an enlargement 41 in screw-thread engagement with a large bore 43 in the end of the valve casing 10. Thus, manual rotation of the valve stem 37 by means of a handle 44 on the outer end of the valve stem moves the valve seat 40 towards and away from the piston 20, the diametrical bore 38 of the valve stem remaining in communication with the transverse bore 17 of the valve casing throughout the range of adjustment of the valve seat. To prevent leakage around the valve stem 37 a suitable gland 45 may be threaded onto the end of the valve casing 10 to compress suitable packing 46 surrounding the valve stem.

The second valve means is completed by a valve member 50 carried by and preferably integral with the piston 20, the valve member being formed with a conical nose 51 to conform with the conical configuration of the valve seat 40. Seating of the valve member 50 in the valve seat 40 reduces the cross-sectional area of the piston that is subject to pressure in the outlet portion 25 of the valve chamber and thereby tends to set up a pressure differential to maintain the piston in its leftward limit position. A suitable coil spring 52 is mounted in the outlet portion 25 of the valve chamber for continuous pressure against the downstream face 34 of the piston to compensate, at least in part, for any such pressure differential and thereby to at least reduce the tendency of the piston to prolong the seating of the valve member 50.

Under conditions of normal steady flow the piston hovers around an equilibrium position, as indicated in Figure 2, or in a narrow range of equilibrium positions with the two angular passages 30 and 33 of the piston in partial registration with the annular groove 32 and with the nose of the valve member 50 spaced from, but relatively close to the valve seat 40. Further leftward movement of the piston, as viewed in Figure 2, would progressively restrict fluid flow out of the outlet portion 25 of the valve chamber and at the same time would progressively increase the freedom of flow through the piston into the outlet portion of the valve chamber, and the tendency of the piston to seek an equilibrium position may be undertsood from this fact.

It is also apparent that adjustment of the valve seat 40 toward and away from the piston by rotation of the handle 44 would cause the piston to seek a new equilibrium position or range of equilibrium positions, outward adjustment of the valve seat shifting the equilibrium position to the left for increased flow and inward adjustment shifting the equilibrium position to the right for reduced flow through the valve.

When the valve is constructed with a transparent cylindrical wall 11 for the purpose of observation, the piston can be seen to hover or continually shift to slight degree. Such hovering may be the result of slight pressure fluctuations in the pressure of the fluid supplied to the valve, but there is some reason to believe that the hovering movement may be inherent in the operation of the valve. Thus, a certain minor degree of instability may arise from the fact that the fluid streaming into the valve seat 40 creates a pressure differential tending to force the valve member 50 further into the valve seat, which pressure differential is immediately destroyed by the responsive movement of the piston causing reduction of flow into the valve seat. It may also be noted that the responsive movement of the piston also increases the pressure of the spring 52. In any event, there is a marked tendency for the piston to hover and since the piston is extremely sensitive to minor differences in fluid pressure on its opposite faces, it shifts with sufficient frequency to dislodge any accumulations or foreign particles in its range of movement, including any obstructing material in the valve seat 40.

On the one hand, any excessive sudden pressure rise on the upstream side of the piston 20 immediately shifts the highly responsive piston leftward, as viewed in the drawings, to seat the valve member 50 in the valve seat 40 and thereby prevent transmission of the pressure rise through the valve. Thus, the valve acts automatically to prevent destructive pressure from reaching any part of the system downstream from the valve.

On the other hand, the piston, aided by the spring 52, responds quickly to a pressure differential in the opposite direction and promptly moves to the rightward limit position, shown in Figure 1, to prevent reverse flow through the valve. This last automatic action on the part of the valve may be useful to maintain pressure downstream from the valve in the event of pressure failure above the valve, and may prevent excessive loss of fluid from the system in the event a break occurs in the pipe or tubing upstream from the valve.

Preferably the valve is installed in a vertical position with the handle 44 at the top so that the weight of the piston as well as the force of the spring will urge the piston towards the position shown in Figure 1. In fact, with the valve in such a vertical position, the spring may be omitted in some installations.

My disclosure herein in specific detail of my preferred embodiment of the invention for the purpose of illustration will suggest to those skilled in the art various changes and modifications within the scope and spirit of my appended claims.

Having described my invention, I claim:

1. A flow regulating device of the character described, comprising: a valve casing forming a cylindrical valve chamber with an inlet port and an outlet port, said chamber having an inner recess between said ports; a piston in said chamber for movement between said ports across said recess, said piston having a passage from the inlet side of the piston to a peripheral point of the piston and a passage from the outlet side of the piston to a second peripheral point of the piston spaced from the first peripheral point, said peripheral points being positioned for simultaneous communication with said recess during the movement of the piston whereby the two passages and the recess constitute a flow passage between said two portions of the chamber with the flow capacity of the passage controlled by the position of the piston relative to said recess; yielding means urging said piston toward a position on the inlet side of said recess to cut off said flow passage; a valve responsive to said piston to cut off flow to said outlet port at a position of the piston at which said flow passage is open; and adjustable means for varying the position of the piston at which said valve cuts off said outlet port.

2. A flow regulating device of the character described, comprising: a valve casing forming a cylindrical valve chamber with an inlet port and an outlet port, said chamber having an inner recess between said ports; a piston in said chamber for movement between said ports across said recess, said piston having a passage from the inlet side of the piston to a peripheral point of the piston and a passage from the outlet side of the piston to a second peripheral point of the piston spaced from the first peripheral point, said peripheral points being positioned for simultaneous communication with said recess during the movement of the piston whereby the two passages and the recess constitute a flow passage between said two portions of the chamber with the flow capacity of the passage controlled by the position of the piston relative to said recess; yielding means urging said piston toward a position on the inlet side of said recess to cut off said flow passage; a valve seat in said outlet portion of the chamber through which fluid flows to said outlet port, said valve seat facing said piston; a valve member carried by the piston directed toward said seat to cooperate with said seat both for cutting off said outlet port and for stopping said piston at a limit position at which said flow passage is open; and means to vary the position of said valve seat thereby to vary said limit position of the piston.

3. A flow regulating device as set forth in claim 2 in which said valve seat is on the inner end of a threaded member having a portion exposed outside said chamber to permit manual adjustment thereof.

4. A flow regulating device of the character described, comprising: a valve casing forming a valve chamber having an inlet port and an outlet port; and a piston sliding in said chamber between said ports responsive to the exertion of fluid pressure thereagainst and dividing the chamber into an inlet portion including said inlet port and an outlet portion including said outlet port, said piston having its periphery slidably contacting the wall of the chamber in each position to which the piston is slidably moved, said wall having a groove, the piston having an inflow passage extending from said inlet portion to the periphery of the piston and an outflow passage extending from said periphery to said outlet portion of the valve chamber with the peripherally disposed ends of said passages arranged to be brought simultaneously into communication with said groove on sliding movement of the piston to a predetermined position in the chamber, whereby to constitute, with said groove, a flow passage extending between said portions of the chamber.

5. A flow regulating device as in claim 4, wherein said groove is extended circumferentially of the chamber and lies in a plane normal to the line of sliding movement of the piston, with said peripherally disposed ends of the passages being arranged in a common plane registering with the first-named plane in said predetermined position of the piston.

6. A flow regulating device as in claim 5, wherein said passages and groove are proportioned to remain in communication both when in full and in partial register, whereby to vary the cross-sectional area of the flow passage responsive to movement of the piston away from said predetermined position thereof.

7. A flow regulating device as in claim 5, wherein said groove is of greater width than the piston passages, whereby to retain the groove and piston passages in full register, on deviation of the piston from said predetermined position thereof occasioned by predetermined variations in pressure exerted thereagainst.

8. A flow regulating device of the character described, comprising: a valve casing forming a valve chamber having an inlet port and an outlet port; a piston sliding in said chamber between said ports responsive to the exertion of fluid pressure thereagainst and dividing the chamber into inlet and outlet portions including, respectively, the inlet and outlet ports, said piston having its periphery slidably contacting the wall of the chamber in each position to which the piston is slidably moved, said wall having a circumferential groove, the piston having an inflow passage extending from the inlet portion of the chamber to the periphery of the piston and an outflow passage extending from said periphery to said outlet portion with the peripherally disposed ends of said passages being brought into simultaneous communication with said groove on sliding movement of the piston to a predetermined position in the chamber to form a flow passage extending between said inlet and outlet portions; a valve seat in the outlet portion of the chamber through which fluid flows to the outlet port, said seat facing the piston; and a valve member on the piston directed toward said seat, said piston passages being shifted out of full register with said groove on movement of the piston in a direction away from said seat, whereby to increase the flow capacity of said seat in direct relation to an attendant decrease in the capacity of said flow passage.

ALBERT F. BARTOLAT.

References Cited in the file of this patent

UNITED STATES PATENTS

| Number | Name | Date |
|---|---|---|
| 395,387 | Ford | Jan. 1, 1889 |
| 1,861,375 | Ahnberg | May 31, 1932 |
| 2,468,960 | Case | May 3, 1949 |
| 2,584,418 | Branson | Feb. 5, 1952 |